(12) United States Patent
Kwon et al.

(10) Patent No.: US 7,903,559 B2
(45) Date of Patent: *Mar. 8, 2011

(54) APPARATUS AND METHOD FOR TRANSMITTING REVERSE PACKET DATA IN MOBILE COMMUNICATION SYSTEM

(75) Inventors: Hwan-Joon Kwon, Gyeonggi-do (KR); Dong-hee Kim, Seoul (KR); Youn-Sun Kim, Seongnam-si (KR); Jin-Kyu Han, Seoul (KR)

(73) Assignee: Samsung Electronics Co., Ltd (KR)

( * ) Notice: Subject to any disclaimer, the term of this patent is extended or adjusted under 35 U.S.C. 154(b) by 91 days.

This patent is subject to a terminal disclaimer.

(21) Appl. No.: 12/476,641

(22) Filed: Jun. 2, 2009

(65) Prior Publication Data

US 2009/0245101 A1 Oct. 1, 2009

Related U.S. Application Data

(63) Continuation of application No. 10/882,637, filed on Jul. 1, 2004, now Pat. No. 7,593,332.

(30) Foreign Application Priority Data

Jul. 1, 2003 (KR) .......................... 10-2003-44408
Jul. 7, 2003 (KR) .......................... 10-2003-45886

(51) Int. Cl.
*H04J 1/16* (2006.01)
*H04J 3/14* (2006.01)

(52) U.S. Cl. ......... 370/232; 370/253; 370/328; 370/342; 370/465; 455/522

(58) Field of Classification Search .................. 370/229, 370/232–234, 252, 328–329, 335, 342; 455/69, 455/522

See application file for complete search history.

(56) References Cited

U.S. PATENT DOCUMENTS

| 4,888,767 | A | 12/1989 | Furuya et al. |
| 5,487,068 | A | 1/1996 | Smolinske et al. |
| 6,219,343 | B1 | 4/2001 | Honkasalo et al. |
| 6,567,388 | B1 | 5/2003 | Tomcik et al. |
| 7,327,716 | B2 * | 2/2008 | Fong et al. ...................... 370/349 |
| 2002/0141349 | A1 * | 10/2002 | Kim et al. ...................... 370/252 |
| 2002/0145985 | A1 | 10/2002 | Love et al. |
| 2002/0154610 | A1 | 10/2002 | Tiedemann et al. |
| 2002/0183064 | A1 | 12/2002 | Gopalakrishnan et al. |
| 2004/0240424 | A1 | 12/2004 | Fong et al. |
| 2005/0176435 | A1 | 8/2005 | Fauconnier et al. |

FOREIGN PATENT DOCUMENTS

| EP | 1 193 881 | 4/2002 |
| JP | 2001-217159 | 8/2000 |
| JP | 2005-510118 | 4/2005 |
| WO | WO 03/043218 | 5/2003 |

* cited by examiner

*Primary Examiner* — Dwayne D Bost
*Assistant Examiner* — Inder P Mehra
(74) *Attorney, Agent, or Firm* — The Farrell Law Firm, P.C.

(57) ABSTRACT

A method for controlling a reply signal transmission in a mobile communication system. The method includes determining whether an error is detected in the received data through the radio channel, generating a reply signal according to the error detection, determining a repetition control signal with a value that differs according to a data transmission rate, repeatedly replicating the reply signal according to the repetition control signal, and transmitting the replicated reply signal through the radio channel.

8 Claims, 15 Drawing Sheets

APPARATUS AND METHOD FOR TRANSMITTING REVERSE PACKET DATA IN MOBILE COMMUNICATION SYSTEM

PRIORITY

This application is a Continuation of U.S. patent application Ser. No. 10/882,637 filed on Jul. 1, 2004 now U.S. Pat. No. 7,593,332, and claims priority to two applications filed in the Korean Intellectual Property Office on Jul. 1, 2003 and Jul. 7, 2003, and assigned Serial Nos. 2003-44408 and 2003-45886, respectively, the contents of which are incorporated herein by reference.

BACKGROUND OF THE INVENTION

1. Field of the Invention

The present invention relates to a mobile communication system, and more particularly to an apparatus and method for efficiently transmitting reverse packet data in a mobile communication system.

2. Description of the Related Art

Conventionally, data transmission in a mobile communication system can be divided into a forward data transmission and a reverse data transmission. The forward data transmission is a data transmission from a base station to a mobile terminal, while the reverse data transmission is a data transmission from the mobile terminal to the base station. A data transmission form can be divided into categories supporting only voice service, supporting voice service and simple data service, supporting only high-speed data service, and simultaneously supporting multimedia service and voice service according to type of data transmitted from the mobile communication system. Mobile communication systems providing the data service described above are designed to process a large amount of information at a fast rate.

The mobile communication system for simultaneously processing the multimedia service and voice service supports the multimedia service using the same frequency band. Moreover, a plurality of users can simultaneously transmit data by means of code division multiple access (CDMA) in the mobile communication system. In this case, the users can be identified by unique numbers allocated thereto in the CDMA. In the CDMA, the reverse data transmission is performed through a packet data channel in units of a physical layer packet (RLP). The length of the packet is fixed according to the data transmission rate. The packet data transmission rate is variable for each packet. The transmission rate of each packet is controlled by the power of the mobile terminal, an amount of data to be transmitted, a power control bit, etc. The power control bit is control information transmitted through a forward rate control channel (F-RCCH) from the base station.

Furthermore, the mobile communication system can carry out retransmission in a physical layer to improve the reverse throughput. According to the retransmission in the physical layer, an acknowledgement/non-acknowledgement (ACK/NACK) signal is sent according to the presence of a packet error (e.g., cyclic redundancy check (CRC)) after the base station demodulates the received reverse data packet, and the mobile terminal receives the ACK/NACK signal to determine whether a previously transmitted packet must be retransmitted or a new packet must be transmitted. The physical layer's retransmission process is called hybrid auto repeat and request (HARQ). According to the retransmission process in the physical layer, the base station demodulates the received reverse data packet, and the ACK/NACK signal of the physical layer is sent according to a packet error or CRC. If the ACK signal has been received from the base station, the mobile terminal determines that the previously transmitted packet has been successfully received and transmits a new packet. Otherwise, if the NACK signal has been received from the base station, the mobile terminal determines that the transmitted packet has not been successfully received and retransmits the previous packet.

On the other hand, a method for controlling reply signal reception in the conventional mobile communication system will be described with reference to the flow chart shown in FIG. 1.

First, the reply signal receiver is in a standby state at step 101. Subsequently, the reply signal receiver determines, at step 102, whether or not the ACK signal has been received from a reply signal transmitter. If the ACK signal has been received, the reply signal receiver determines that a previously transmitted packet has been successfully received from the reply signal transmitter and transmits new packet data at step 103. However, if the ACK signal has not been received, the reply signal receiver determines, at step 104, whether or not the NACK signal has been received from the reply signal transmitter. If the NACK signal has been received, the reply signal receiver determines that the previously transmitted packet has not been successfully received by the reply signal transmitter, and retransmits the previously transmitted packet at step 105. If neither the ACK nor the NACK signal had been received, the process returns to the standby state of step 101.

A method for controlling reply signal transmission in the conventional mobile communication system will be described with reference to the flow chart shown in FIG. 2.

The reply signal transmitter is in a standby state at step 201. The reply signal transmitter determines, at step 202, whether or not the packet data has been received from the reply signal receiver. If the packet data has not been received, the reply signal transmitter proceeds to the above step 201 so that it can maintain the standby state before the packet data is received. However, if the packet data has been received, the reply signal transmitter demodulates the packet data at step 203. Subsequently, the reply signal transmitter determines, at step 204, whether or not an error is present in the received packet data. If an error is present in the packet data, the reply signal transmitter transmits the NACK signal to the reply signal receiver so that a packet data retransmission request is made at step 205. However, if no error is present in the packet data, the reply signal transmitter transmits the ACK signal to the reply signal receiver so that a new data transmission request is made at step 206.

Because an incurable error at the time of transmitting and receiving the ACK/NACK signal as described above is directly associated with throughput of the entire system, high reliability is required. The reliability depends upon the transmission power of an acknowledgement channel that transmits and receives an ACK/NACK signal. Assuming that the reply signal transmitter has successfully received the packet data and then has transmitted the ACK signal to the reply signal receiver, the reply signal receiver may erroneously determine that the NACK signal has been received due to an incurable error at the time of receiving the ACK signal. At this point, the reply signal receiver unnecessarily retransmits the packet already successfully received by the reply signal transmitter. Consequently, there is a waste of radio resources and a degradation of throughput may result.

Assuming that the reply signal transmitter has unsuccessfully received the packet data and then has transmitted the NACK signal for a retransmission request, the reply signal receiver may erroneously determine that the ACK signal has been received due to an incurable error at the time of receiving the NACK signal. At this point, although a transmission error has occurred on a radio link, the reply signal receiver will transmit the next packet to the reply signal transmitter. This causes link-layer retransmission or higher-layer retransmission such as transmission control protocol (TCP) retransmission. Consequently, throughput degradation may occur.

Limited resources used for the forward transmission include electric power of the base station. As the power of the base station increases, the amount of interference affecting an adjacent base station increases. For this reason, the power of the base station must be limited to an appropriate power value. However, a data transmission rate capable of being acquired by the power of the base station is limited. Thus, a forward design of the mobile communication system must be achieved so that the limitation can be overcome.

Interference is a factor limiting the reverse resources. Reverse transmission signals of mobile terminals cause interference with each other. Where a plurality of mobile terminals are coupled to one base station, one mobile terminal performs a transmission operation using a high power level so that a high data transmission rate can be acquired. The base station communicating with the mobile terminal will receive a signal at the high power level from the mobile terminal. The high power causes a large amount of interference to signals of other mobile terminals. If the plurality of mobile terminals simultaneously desire to transmit data at the high transmission rate, a total amount of reverse interference is very high and the probability that the signals of all mobile terminals can be successfully received is lowered. Thus, in order for the throughput of the mobile communication system to be maximized, the base station adjusts the total amount of reverse interference. The base station must efficiently manage data transmission rates of the mobile terminals.

FIG. 3 is a graph explaining the reason why the base station must efficiently adjust reverse transmission of the mobile terminals. A dotted line in FIG. 3 denotes target system load or target rise over thermal (RoT) of the base station. RoT is a ratio between the total power received from all the mobile terminals at the base station and the thermal noise power as one measure of the total reverse interference.

The reason why the base station must manage the target system load or target RoT is as follows. Conventionally, the mobile communication system supports power control so that the quality of a reverse or forward link is ensured. When the base station does not manage reverse system load or the total of received reverse power is below a specific value, the value of the reverse system load or the total of received reverse power may be great. In this case, the amount of interference may also be great. Therefore, signal to noise power ratio (SNRs) associated with the signals of all the mobile terminals are reduced. In this case, in order for communication quality of each link to be maintained, the mobile terminals continuously increase power output. As a vicious cycle causing an increase in the amount of interference is repeated, communication can be disabled. For example, when one mobile terminal associated with a data transmission rate uses high power to acquire a high data transmission rate, an amount of reverse interference due to the mobile terminal greatly increases and other mobile terminals increase power to maintain link quality. As the amount of interference increases, the vicious cycle is repeated. To avoid the above-described vicious cycle, the base station needs to efficiently control data transmission rates of all the mobile terminals so that the reverse load cannot exceed the target system load. Moreover, the base station needs to control all the mobile terminals so that the total of the received reverse signal power does not exceed the target RoT.

As shown in FIG. 3, the reverse interference can be divided into an inter-cell interference, a voice or circuit channel interference, a packet data channel interference, etc.

The inter-cell interference is an interference occurring due to signals received from the mobile terminals communicating with another base station. The amount of inter-cell interference varies with time. Moreover, the inter-cell interference is an interference from the mobile terminals communicating with another base station. The amount of inter-cell interference cannot be controlled or correctly predicted by a reference base station.

The voice or circuit channel interference is an interference caused by another voice channel or circuit-based channel. Because the voice or circuit channel is a channel allocated by the base station, the base station can predict a basic amount of interference. Typically, the voice or circuit channel has a higher priority than the packet data channel.

The packet data channel interference is an interference occurring from a packet data channel. The base station appropriately adjusts the amount of interference occurring from the packet data channel. After the base station subtracts an amount of inter-cell interference and an amount of voice or circuit channel interference from the overall system load or RoT, it allocates the remaining amount of power to the packet data channel. At this point, the base station appropriately adjusts the amount of interference occurring from the packet data channel and performs a control operation so that the entire system load or RoT does not exceed the entire target system load or target RoT.

The base station controls reverse packet data transmission of the mobile terminals, that is, reverse data transmission rates of the mobile terminals, on the basis of the target system load or target RoT, thereby adjusting the total amount of reverse interference.

In the conventional mobile communication system, the base station transmits a rate control bit (RCB) through a forward rate control channel (F-RCCH) so that the data transmission rates of the mobile terminals can be controlled. The RCB has "0", "+1" or "−1". When the RCB value is "+1", the mobile terminal increments its own data transmission rate by one step. When the RCB value is "−1", the mobile terminal decrements its own data transmission rate by one step in the next transmission interval. When the RCB value is "0", the mobile terminal maintains its own data transmission rate in the next transmission interval.

In order for the mobile communication system to control the reverse data transmission rates of the mobile terminals, reliability of the RCB transmitted by the base station is equally set in all the mobile terminals irrespective of current data transmission rates of the mobile terminals. Accordingly, there are the following problems.

First, as an example, it is assumed that the RoT of 6 dB operates as the target RoT when the base station controls reverse transmission. This means that the base station performs a control operation so that a value of the entire reverse reception RoT does not exceed 6 dB when deciding a data transmission rate of the reverse packet data channel of each mobile terminal. Reverse RoT management is one of the important elements necessary for maintaining the entire reverse performance. In the case where the base station requests that the mobile terminals simultaneously increment data transmission rates, a scheduling operation of the base station determines whether or not the reverse RoT exceeds 6 dB, when incrementing the data transmission rates of the mobile terminals by one step according to their priorities. If it is determined that the reverse RoT does not exceed 6 dB even though the specific mobile terminal increments the data transmission rate by one step, the base station transmits the RCB so that the data transmission rate of the specific mobile terminal can be incremented by one step. Otherwise, if it is determined that the reverse RoT does exceed 6 dB when the specific mobile terminal increments the data transmission rate by one step, the base station transmits the RCB so that the specific mobile terminal can decrement its own data transmission rate by one step or continuously maintain the current data transmission rate. For example, it is assumed that the RoT measured at a specific time point is 2 dB. When a current data transmission rate of 9.6 kbps in the mobile terminal is incremented by one step, the incremented data transmission rate is 19.2 kbps. In this case, it is assumed that the data transmission rate is incremented by 9.6 kbps and a predicted RoT is 2.0+delta1 dB. On the other hand, when a current data transmission rate of 307.2 kbps in the mobile terminal is incremented by one step, the incremented data transmission rate is 614.4 kbps. In this case, it is assumed that the data transmission rate is incremented by 307.2 kbps and predicted RoT is 2.0+delta2 dB. Delta1 is approximately 32 times as large as delta2 as shown in the following Equation 1.

$$delta2 = delta1 * 307.2 \text{ kbps}/9.6 \text{ kbps} \quad (1)$$

It can be seen from the above Equation 1 that the target system RoT associated with the RCB is proportional to an increment value of the data transmission rate.

A case where an error is incurred in the RCB will be described. When the mobile terminal increments its own data transmission rate by one step by making an erroneous determination although the base station commands the mobile terminal to decrement the data transmission rate, unpredicted reverse interference occurs and can have a negative effect on the quality of a signal of a different mobile terminal. When the mobile terminal decrements its own data transmission rate by one step by making an erroneous determination although the base station commands the mobile terminal to increment the data transmission rate, reverse resources cannot be completely used.

In order that a determination can be made as to whether or not the effects of an erroneous RCB do not impact the data transmission rates of all the mobile terminals, the next example will be described. It is assumed that the number of mobile terminals trying to perform the reverse transmission to one base station is two at a specific time point. Here, one mobile terminal currently transmits data at a data transmission rate of 9.6 kbps, and the other mobile terminal currently transmits data at a data transmission rate of 307.2 kbps. When an error occurs in the RCB for incrementing the data transmission rate of 9.6 kbps by one step, an RoT error of 2*delta1 will occur. When an error occurs in the RCB for incrementing the data transmission rate of 307.2 kbps by one step, an RoT error of 32*2*delta1 will occur. Therefore, it can be seen that the amount of reverse interference caused by an error in the RCB is intimately associated with the data transmission rate of the mobile terminal.

As described above, an operation for managing the total amount of reverse interference in the base station plays a very important role in maintaining the reverse performance. The base station adjusts the data transmission rate of each mobile terminal through the RCB so that the total amount of interference can be efficiently managed. If the amount of reverse interference caused by an error in the RCB of the mobile terminal is ignored and the same RCB is set for all the mobile terminals, there is a problem in that power of the base station necessary for transmitting the RCB is inefficiently used and the reverse RoT cannot be managed at a desired level.

SUMMARY OF THE INVENTION

Therefore, the present invention has been made in view of the above and other problems, and it is one object of the present invention to provide a method for efficiently transmitting reverse packet data.

It is another object of the present invention to provide a method for improving the reliability of an acknowledgement/non-acknowledgement (ACK/NACK) bit for reverse packet data transmission.

It is another object of the present invention to provide a method for efficiently allocating transmission power of an acknowledgement channel for reverse packet data transmission.

It is another object of the present invention to provide a method for controlling the reliability of a rate control bit (RCB) according to a data transmission rate of a mobile terminal for reverse packet data transmission.

It is another object of the present invention to efficiently transmit a rate control bit (RCB) from a base station according to a data transmission rate.

It is yet another object of the present invention to efficiently manage reverse system load or rise over thermal (RoT) according to a data transmission rate.

In accordance with an object of the present invention, a method for controlling a reply signal transmission in a mobile communication system is provided. The method includes determining whether an error is detected in received data through a radio channel, generating a reply signal according to the error detection, determining a repetition control signal with a value that differs according to a data transmission rate, repeatedly replicating the reply signal according to the repetition control signal, and transmitting the replicated reply signal through the radio channel.

In accordance with another object of the present invention, a method for controlling a reply signal transmission in a mobile communication system is provided. The method includes determining whether an error is detected in received data through a radio channel, generating a reply signal according to the error detection, controlling power for the reply signal with a power value that differs according to a data transmission rate, and transmitting the reply signal based on the controlled power through the radio channel.

In accordance with another object of the present invention, a method for controlling a reply signal reception in a mobile communication system is provided. The method includes receiving a reply signal through a radio channel, determining a symbol summation control signal for controlling a summation based on a number of repetition according to a transmission rate, summing the received reply signal according to the symbol summation control signal, receiving a result of the summation, and determining whether a previously transmitted data has been accurately received, based on the result of the summation.

BRIEF DESCRIPTION OF THE DRAWINGS

The above and other objects, features, and other advantages of the present invention will be more clearly understood from the following detailed description taken in conjunction with the accompanying drawings, in which.

DETAILED DESCRIPTION OF EMBODIMENTS OF THE INVENTION

Now, embodiments of the present invention will be described in detail with reference to the annexed drawings. In the following description, a detailed description of known functions and configurations incorporated herein will be omitted when it may obscure the subject matter of the present invention.

The present invention provides technology for efficiently transmitting reverse packet data. For this, the present invention proposes technology for improving the reliability of an acknowledgement/non-acknowledgement (ACK/NACK) bit associated with reverse transmission data or controlling the reliability of a rate control bit (RCB) according to a data transmission rate of the mobile terminal.

Figure 5:
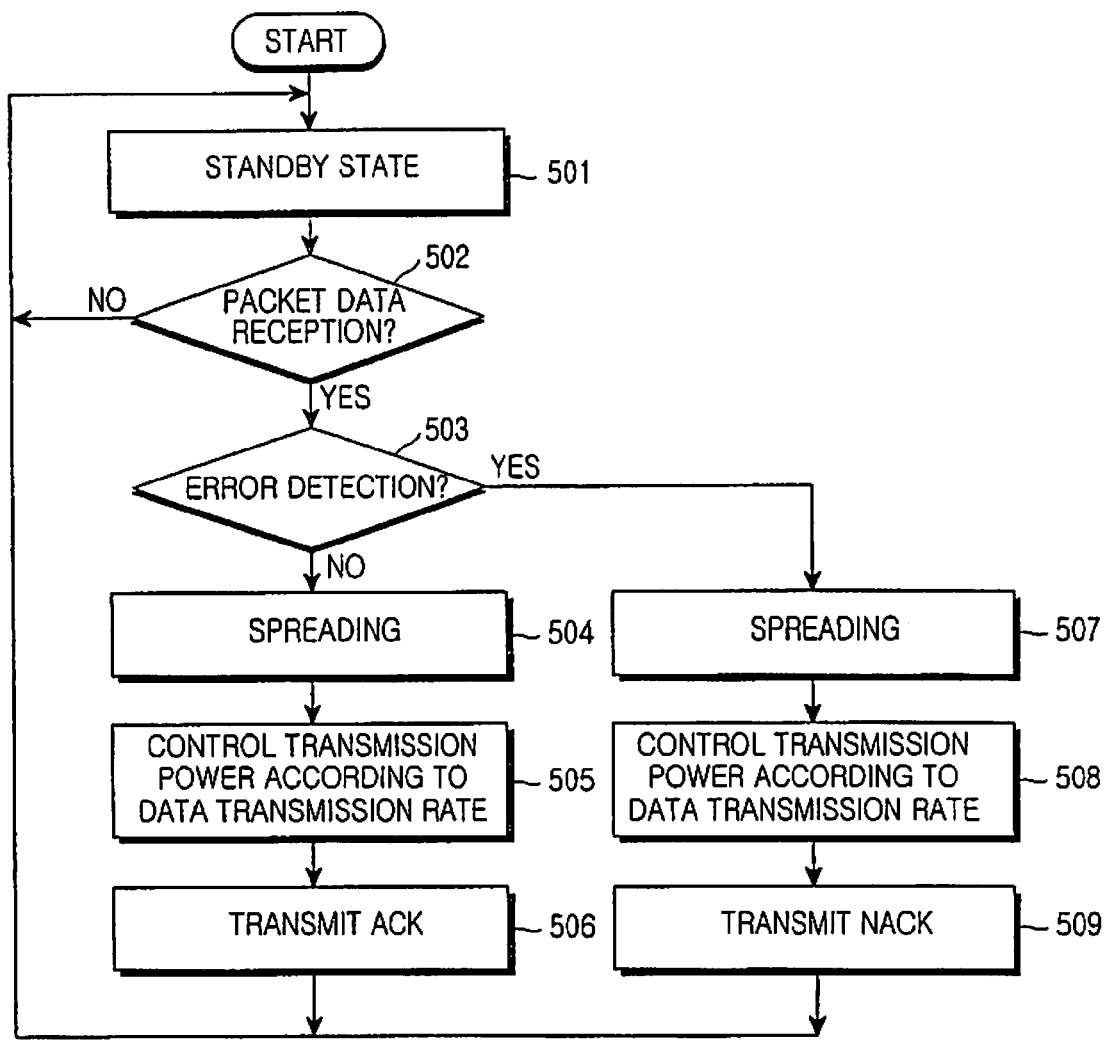
FIG. 5 is a flow chart illustrating a method for controlling reply signal transmission in the mobile communication system in accordance with the first embodiment of the present invention.
Figure 6:
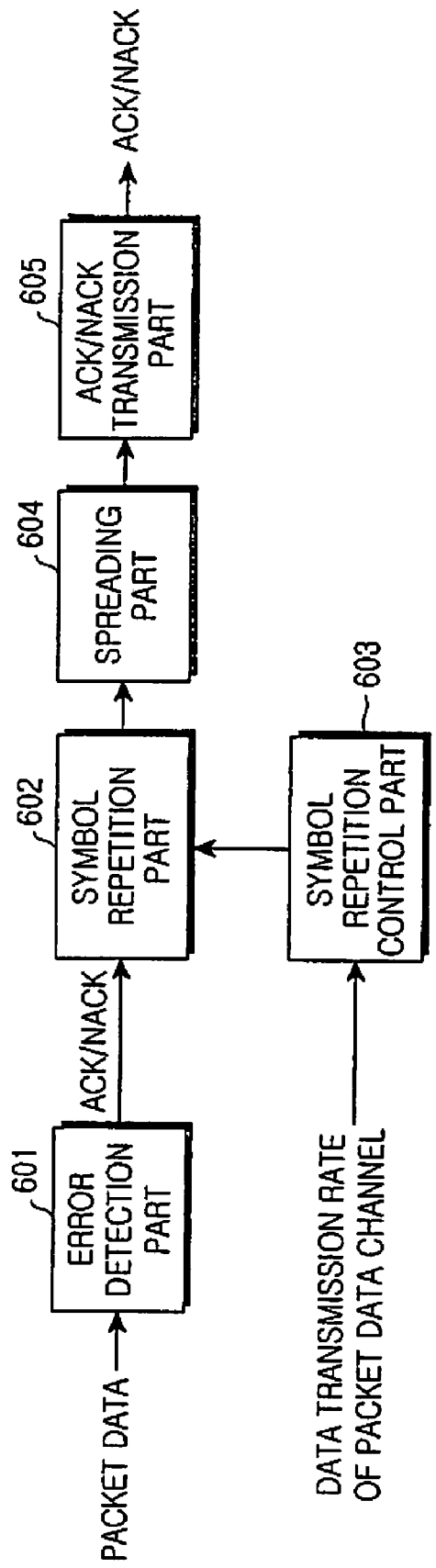
FIG. 6 is a block diagram illustrating the reply signal transmitter in accordance with the second embodiment of the present invention.

1. Technology for Improving the Reliability of an ACK/NACK Bit Associated with Reverse Transmission Data An apparatus for controlling a reply signal transmission and reception in a mobile communication system in accordance with the present invention is shown in FIGS. 4, 5 and 6.

First Embodiment

Figure 1:
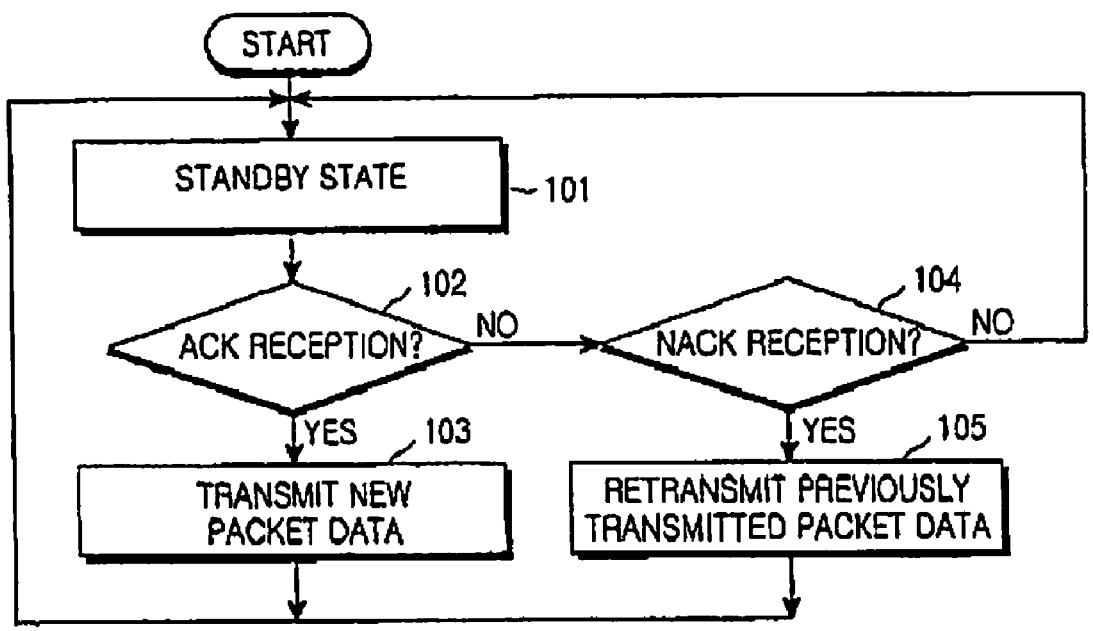
FIG. 1 is a flow chart illustrating a method for controlling reply signal reception in a conventional mobile communication system.
Figure 2:
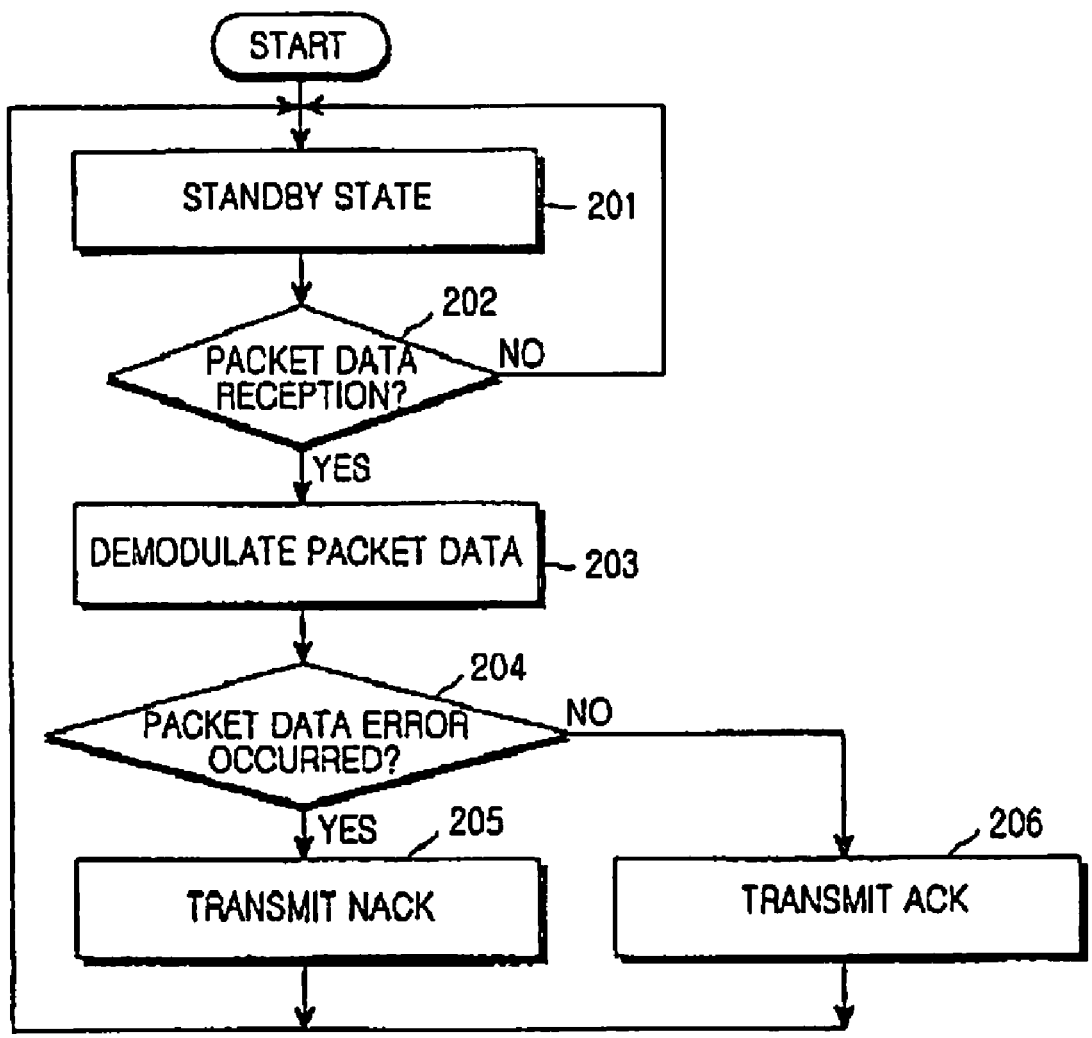
FIG. 2 is a flow chart illustrating a method for controlling reply signal transmission in the conventional mobile communication system.
Figure 3:
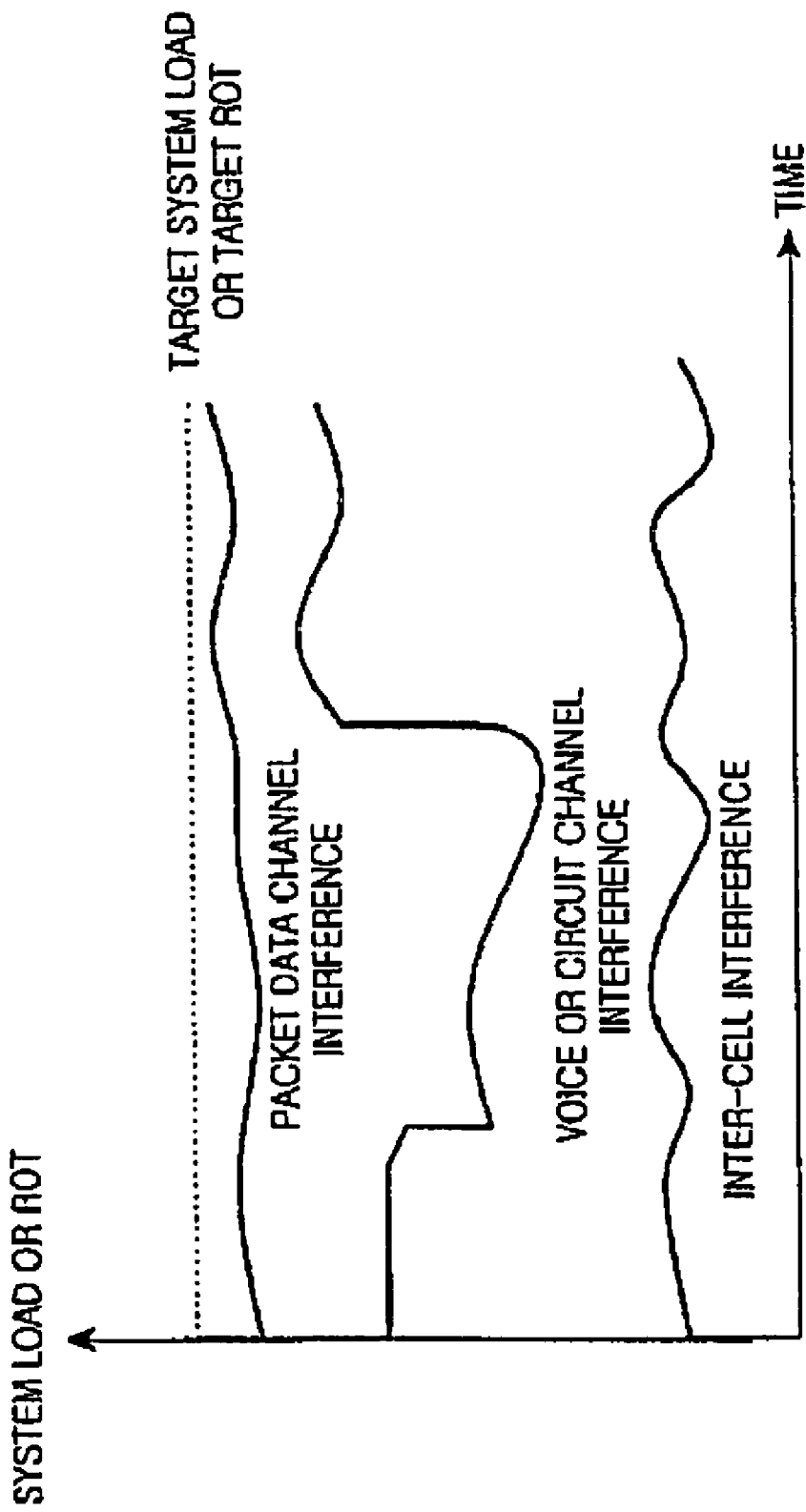
FIG. 3 is a graph illustrating reverse transmission causing the conventional reverse interference.
Figure 4:
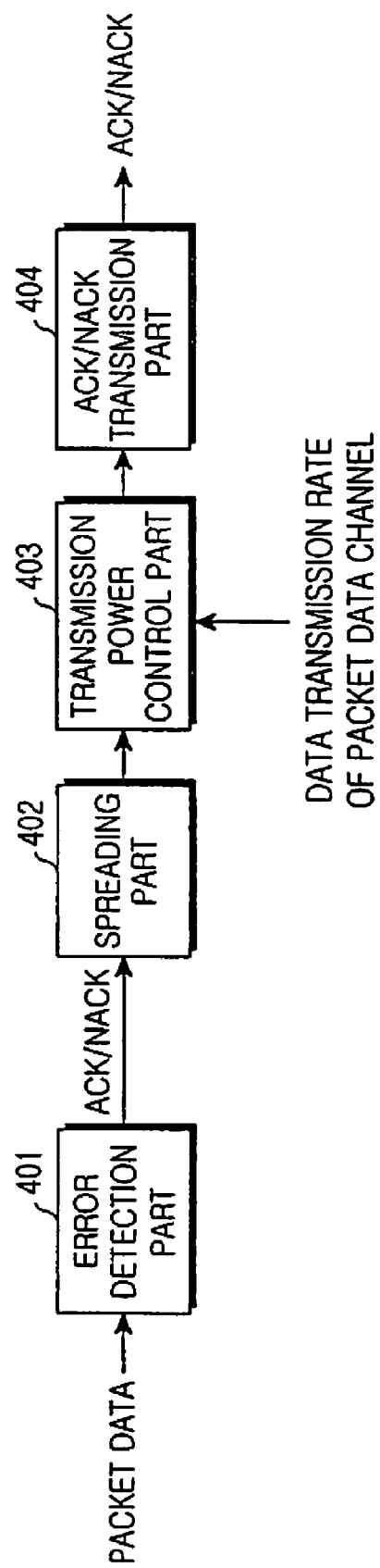
FIG. 4 is a block diagram illustrating a reply signal transmitter in accordance with the first embodiment of the present invention.

The reply signal transmitter includes an error detection part 401, a spreading part 402, a transmission power control part 403 and an ACK/NACK transmission part 404 as shown in FIG. 4. The error detection part 401 receives packet data and detects an error of the packet data received through a radio channel. If no error is detected, the error detection part 401 generates and outputs an ACK bit. Otherwise, if an error is detected, the error detection part 401 generates and outputs an NACK bit. The spreading part 402 receives and spreads the ACK/NACK bit so that the ACK/NACK bit can be transmitted through the radio channel. The transmission power control part 403 performs a power control operation for the spread ACK/NACK bit on the basis of a power value corresponding to a data transmission rate of a packet data channel and outputs a result of the power control operation. The ACK/NACK transmission part 404 transmits the ACK/NACK bit output from the transmission power control part 403 through the radio channel.

Here, the transmission power control part 403 controls the transmission power of an acknowledgement channel according to a data transmission rate of the reverse packet data channel using the following Table 1.

TABLE 1

| Data rate of R-PDCH (kbps) | Acknowledgement channel transmission power (Ec/Ior) |
| --- | --- |
| 9.6 | −44 dB |
| 19.2 | −43 dB |
| 38.4 | −42 dB |
| 76.8 | −41 dB |
| 153.6 | −40 dB |
| 307.2 | −39 dB |
| 614.4 | −38 dB |
| 1024 | −37 dB |

In the above Table 1, the first column denotes a data transmission rate of the reverse packet data channel and the second column denotes power allocated to an acknowledgement channel by a base station. In the above Table 1, the transmission power of the base station is expressed as Ec/Ior. As a transmission rate of a specific channel with respect to the total transmission power of the base station increases, it can be seen that the transmission power of the acknowledgement channel allocated by the base station increases. For example, when the data transmission rate is 153.6 kbps, the transmission power of the acknowledgement channel is set to −40 dB so that the ACK/NACK bit can be transmitted to the reply signal receiver. Moreover, when the data transmission rate is 307.2 kbps, the transmission power of the acknowledgement channel is set to −39 dB so that the ACK/NACK bit can be transmitted to the reply signal receiver.

Therefore, the reliability of receiving the ACK/NACK bit can be improved by controlling the data transmission rate.

A method for controlling a reply signal transmission in the mobile communication system in accordance with the embodiment of the present invention will be described with reference to the flow chart shown in FIG. 5.

First, the reply signal transmitter is in a standby state at step 501. The reply signal transmitter determines, at step 502, whether or not packet data has been received from the reply signal receiver. If no packet data has been received from the reply signal receiver, the reply signal transmitter maintains the standby state at the above step 501. Otherwise, if packet data has been received from the reply signal receiver, the reply signal transmitter determines, at step 503, whether or not an error has been detected. If no error has been detected, the reply signal transmitter generates and spreads an ACK bit so that the ACK bit can be transmitted through a radio channel at step 504. The reply signal transmitter performs a power control operation for the spread ACK bit with a power value that differs according to a data transmission rate of the packet data channel and outputs a result of the power control operation at step 505. Subsequently, the reply signal transmitter transmits the ACK bit to the reply signal receiver through the radio channel at step 506.

On the other hand, if an error has been detected in the packet data received at the above step 503, the reply signal transmitter generates and spreads an NACK bit so that the NACK bit can be transmitted through the radio channel at step 507. The reply signal transmitter performs a power control operation for the spread NACK bit with a power value that differs according to a data transmission rate of the packet data channel and outputs a result of the power control operation at step 508. Because the acknowledgement channel transmission power increases as the transmission rate of the reverse data channel increases, the reliability of receiving the ACK/NACK bit can be improved as shown in the above Table 1.

Subsequently, the reply signal transmitter transmits the NACK bit to the reply signal receiver through the radio channel at step 509.

Second Embodiment

The reply signal transmitter in accordance with the second embodiment of the present invention includes an error detection part 601, a symbol repetition part 602, a symbol repetition control part 603, a spreading part 604 and an ACK/NACK transmission part 605 as shown in FIG. 6.

The error detection part 601 receives the packet data through the radio channel and then detects if there is an error from the received packet data. If an error has been detected, the error detection part 601 generates and outputs the NACK bit. Otherwise, if no error has been detected, the error detection part 601 generates and outputs the ACK bit. The symbol repetition part 602 repeats the ACK/NACK bit according to a repetition control signal and outputs a result of the repetition. The symbol repetition control part 603 outputs a repetition control signal having a value that differs according to the data transmission rate of the packet data channel. The following Table 2 shows the number of repeats of the ACK/NACK bit to be transmitted through a forward acknowledgement channel according to the data transmission rate of the reverse packet data channel. In the following Table 2, the first column denotes the data transmission rate of the reverse packet data channel and the second column denotes the number of repeats of the ACK/NACK bit. For example, when the data transmission rate of the reverse data channel is 153.6 kbps, the number of repeats of the ACK/NACK bit is set to "5". Moreover, when the data transmission rate of the reverse data channel is 307.2 kbps, the number of repeats of the ACK/NACK bit is set to "6". As the transmission rate of the reverse data channel increases, it can be seen that the number of repeats of the ACK/NACK bit increases as shown in the following Table 2. Therefore, the reliability of receiving the ACK/NACK bit can be improved by controlling the transmission rate of the reverse data channel.

TABLE 2

| Data rate of R-PDCH (kbps) | Number of repeats of ACK/NACK bit |
|---|---|
| 9.6 | 1 |
| 19.2 | 2 |
| 38.4 | 3 |
| 76.8 | 4 |
| 153.6 | 5 |
| 307.2 | 6 |
| 614.4 | 7 |
| 1024 | 8 |

The ACK/NACK bit repeated by the symbol repetition part 602 is input into the spreading part 604. The spreading part 604 spreads the ACK/NACK bit repeated by the symbol repetition part 602 so that it can be transmitted through the radio channel, and outputs a result of the spreading. The ACK/NACK transmission part 605 transmits the ACK/NACK bit spread by the spreading part 604 through the radio channel.

Figure 7:
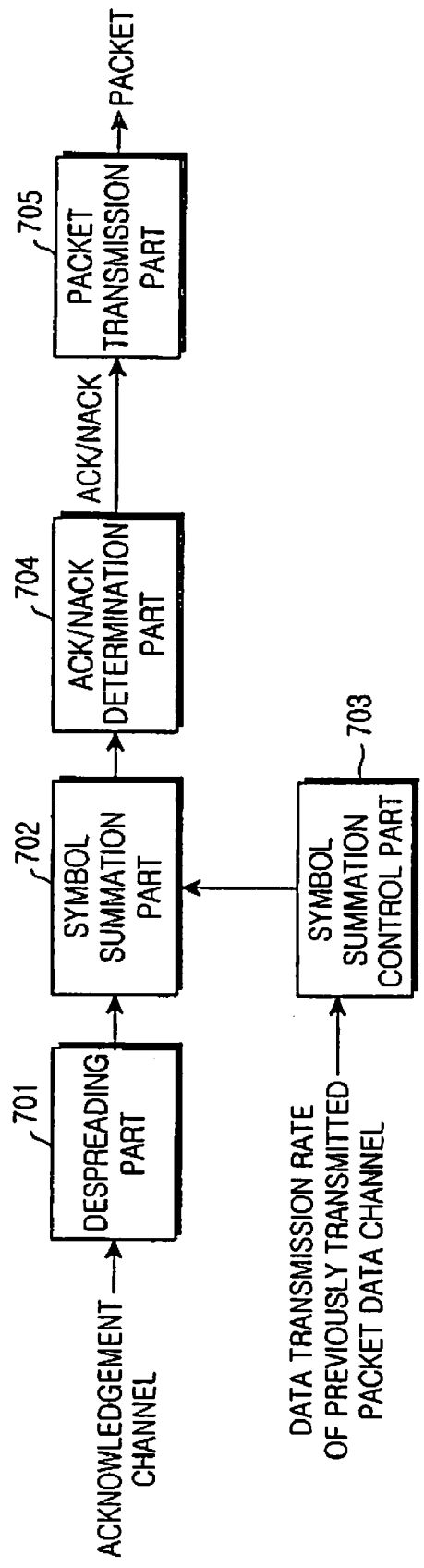
FIG. 7 is a block diagram illustrating a reply signal receiver in accordance with the second embodiment of the present invention.

The reply signal receiver in accordance with another embodiment of the present invention includes a despreading part 701, a symbol summation part 702, a symbol summation control part 703, an ACK/NACK determination part 704 and a packet transmission part 705 as shown in FIG. 7.

The despreading part 701 despreads the ACK/NACK bit received through the acknowledgement channel and outputs a result of the despreading. The symbol summation part 702 receives and sums an output of the despreading part 701 according to a symbol summation control signal. The symbol summation control part 703 outputs the symbol summation control signal so that a summation operation can be performed according to the predetermined number of repeats based on a transmission rate of packet data previously transmitted through the packet data channel. The ACK/NACK determination part 704 receives an output of the symbol spreading part 702 and determines whether or not the previously transmitted packet data has been appropriately received. If the ACK/NACK determination part 704 determines that the previous packet data has been appropriately received, the packet transmission part 705 transmits new packet data. Otherwise, if the ACK/NACK determination part 704 determines that the previous packet data has been inappropriately received, the packet transmission part 705 retransmits the previous packet data.

Figure 8:
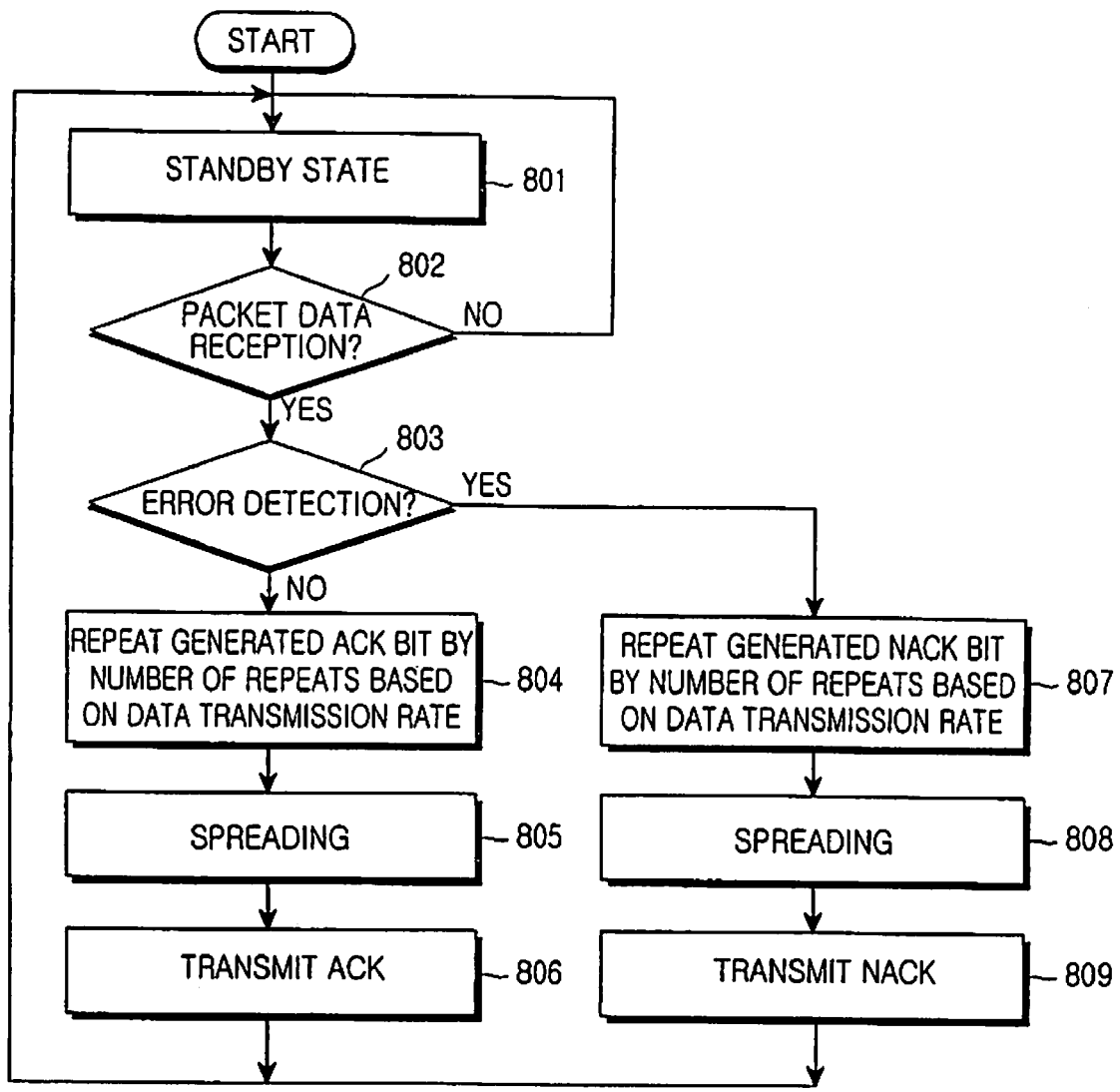
FIG. 8 is a flow chart illustrating a method for controlling reply signal transmission in the mobile communication system in accordance with the second embodiment of the present invention.

A method for controlling reply signal transmission in the mobile communication system in accordance with another embodiment of the present invention will be described with reference to the flow chart shown in FIG. 8.

First, the reply signal transmitter is in a standby state at step 801. The reply signal transmitter determines, at step 802, whether or not packet data has been received from the reply signal receiver. If no packet data has been received from the reply signal receiver, the reply signal transmitter maintains the standby state at the above step 801. Otherwise, if packet data has been received from the reply signal receiver, the reply signal transmitter determines, at step 803, whether or not an error has been detected. If no error has been detected, the reply signal transmitter generates an ACK bit and repeats the generated ACK bit at step 804. At this point, a repetition control signal having a value that differs according to the data transmission rate of the packet data channel is output.

Subsequently, the spreading part 604 spreads the repeated ACK bit and outputs a result of the spreading so that it can be transmitted through the radio channel at step 805. The reply signal transmitter transmits the spread ACK bit to the reply signal receiver through the radio channel at step 806 and maintains the standby state at the above step 801.

On the other hand, if an error has been detected in the packet data received by the reply signal receiver, the reply signal transmitter generates an NACK bit and repeats the generated NACK bit at step 807. At this point, a repetition control signal having a value that differs according to the data transmission rate of the packet data channel is output.

Subsequently, the spreading part 604 spreads the repeated NACK bit and outputs the spread NACK bit so that the NACK bit can be transmitted through the radio channel at step 808. The reply signal transmitter transmits the NACK bit to the reply signal receiver through the radio channel and maintains the standby state at the above step 801.

Accordingly, it can be seen that the number of repeats of the ACK/NACK bit to be transmitted through the acknowledgement channel serving as the channel for feeding back a signal indicating successful or unsuccessful reception of the packet data is controlled by a data transmission rate of the data channel.

Figure 9:
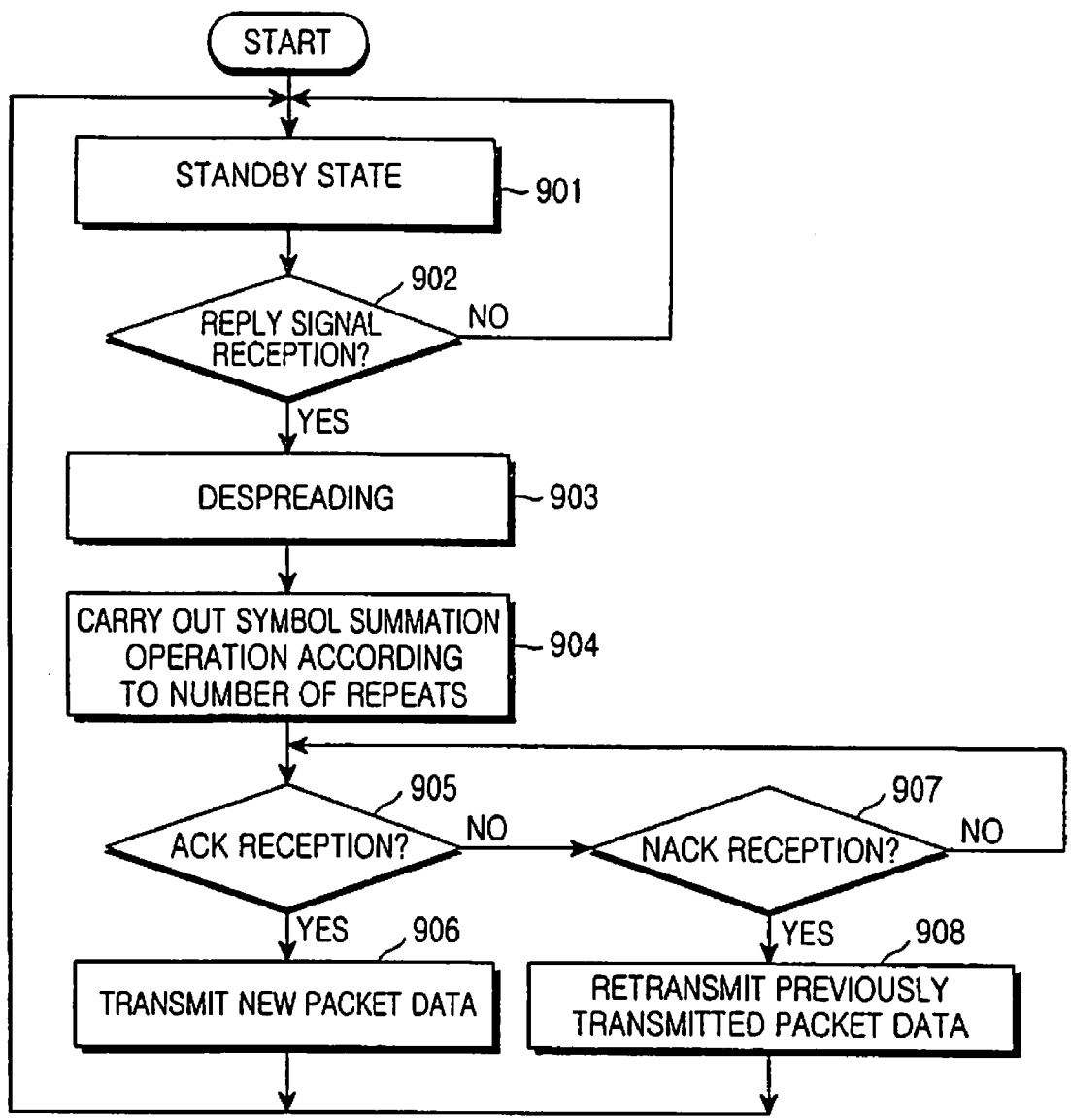
FIG. 9 is a flow chart illustrating a method for controlling reply signal reception in the mobile communication system in accordance with the second embodiment of the present invention.

A method for controlling reply signal reception in the mobile communication system in accordance with another embodiment of the present invention will be described with reference to the flow chart shown in FIG. 9.

First, the reply signal receiver is in a standby state at step 901. The reply signal receiver determines, at step 902, whether or not an ACK/NACK bit has been received from the reply signal transmitter. If no ACK/NACK bit has been received from the reply signal transmitter, the reply signal receiver continuously maintains the standby state at the above step 901. Otherwise, if the ACK/NACK bit has been received, the despreading part 701 despreads the ACK/NACK bit received through the acknowledgement channel and outputs the despread ACK/NACK bit at step 903. The symbol summation part 702 receives and sums an output of the despreading part 701 according to a symbol summation control signal at step 904. At this point, the symbol summation control part 703 outputs the symbol summation control signal so that the summation operation can be performed according to the predetermined number of repeats based on the transmission rate of packet data previously transmitted through the packet data channel. Subsequently, the reply signal receiver determines, at step 905, whether or not the reply signal bit is the ACK bit. If the reply signal bit is the ACK bit, the reply signal receiver determines that the previously transmitted packet data has been successfully received by the reply signal transmitter, and transmits new packet data at step 906. However, if the reply signal bit is not the ACK bit, the reply signal receiver determines, at step 907, whether or not the reply signal bit is the NACK bit. If the reply signal bit is the NACK bit, the reply signal receiver determines that the previously transmitted packet data has not been successfully received by the reply signal transmitter, and retransmits the previous packet data at step 908. If neither the ACK nor the NACK bit is received, the process returns to step 905.

In the process in which the reply signal receiver determines the ACK/NACK bit, the number of repeats of the ACK/NACK bit received through the acknowledgement channel is decided according to a previously transmitted packet transmission rate of a packet data channel and then the ACK/NACK bit is determined.

The present invention improves the reliability of the ACK/NACK bit by controlling transmission power of the acknowledgement channel through which the ACK/NACK bit is transmitted.

Furthermore, the present invention improves the reliability of the ACK/NACK bit by controlling the number of transmissions of the ACK/NACK bit.

2. Method for Controlling a Transmission Rate of Reverse Data

The present invention relates to a method for controlling the reliability of rate control bit (RCB) according to a data transmission rate of the mobile terminal when the base station transmits the RCB so that a transmission rate of the reverse data can be controlled in the mobile communication system.

First, the method for controlling the reliability of the RCB includes a method for controlling transmission power of a forward rate control channel through which the RCB is transmitted and a method for controlling the number of repeats of the RCB.

The reliability required by the RCB can be expressed by the following Equation 2.

$$R_{RCB,required} = \alpha \times R_{current} \quad (2)$$

In the above Equation 2, $\alpha$ is a constant and $R_{current}$ is a current data transmission rate. It can be seen that the reliability required by the RCB, i.e., $R_{RCB,required}$, is proportional to the data transmission rate.

As the method for controlling the reliability of the RCB according to a data transmission rate of the mobile terminal when the base station transmits the RCB, there is a method for controlling transmission power of a channel through which the RCB is transmitted. The transmission power of the channel through which the RCB is transmitted can be expressed as in the following Equation 3.

$$P_{FRCCH} = \beta \times R_{RCH,required} \quad (3)$$

In the above Equation 3, $\beta$ is a constant and $R_{RCH,required}$ is the reliability required by the RCB. It can be seen that the transmission power of the channel through which the RCB is transmitted, i.e. $P_{FRCCH}$, is proportional to the reliability required by the RCB.

As the method for controlling the reliability of the RCB according to a data transmission rate of the mobile terminal when the base station transmits the RCB, there is a method for controlling the number of repeats of the RCB. The number of repeats of the RCB can be expressed by the following Equation 4.

$$N_{RCB} = \gamma R_{RCH,required} \quad (4)$$

In the above Equation 4, $\gamma$ is a constant and $R_{RCH,required}$ is the reliability required by the RCB. It can be seen that the number of repeats of the RCB, i.e. $N_{RCB}$, is proportional to the reliability required by the RCB.

An apparatus and method for controlling the reliability of the RCB according to the data transmission rate of the mobile terminal when the base station transmits the RCB will be described. The base station is referred to as an RCB transmitter because it transmits the RCB and the mobile terminal is referred to as an RCB receiver because it receives the RCB.

Third Embodiment

Figure 10:
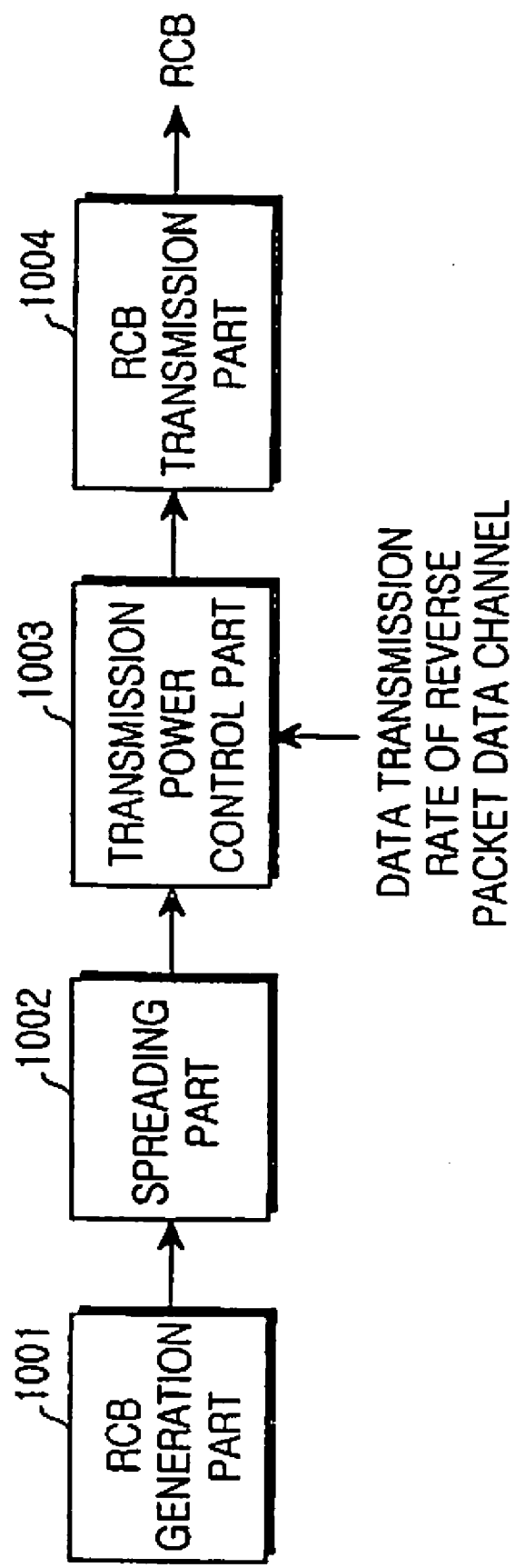
FIG. 10 is a block diagram illustrating a rate control bit (RCB) transmitter in accordance with the third embodiment of the present invention.

The RCB transmitter in accordance with the third embodiment of the present invention as shown in FIG. 10 includes an RCB generation part 1001, a spreading part 1002, a transmission power control part 1003 and an RCB transmission part 1004. When a scheduler (not shown) within the RCB transmitter (i.e. base station) determines whether the RCB must be incremented, decremented or continuously maintained, the RCB generation part 1001 generates and outputs the RCB. The spreading part 1002 receives the RCB, spreads the received RCB and outputs the spread RCB. The transmission power control part 1003 performs a power control operation for the spread RCB with a power value differing according to a data transmission rate of the packet data channel, and outputs a result of the power control operation. The packet data transmission part 1004 transmits the RCB outputted from the transmission power control part 1003 through the radio channel.

Figure 11:
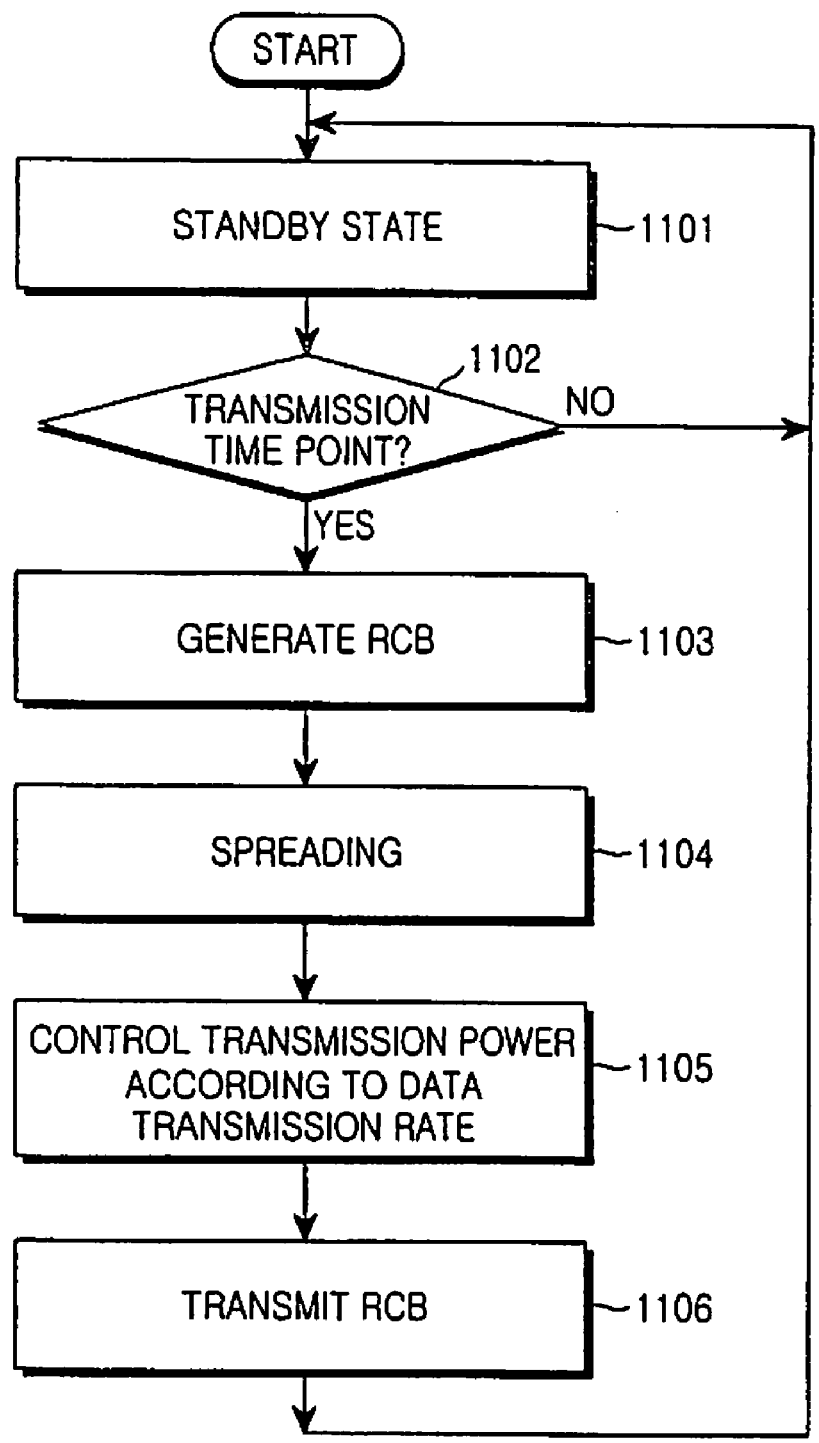
FIG. 11 is a flow chart illustrating a method for transmitting an RCB in accordance with the third embodiment of the present invention.

A method for controlling RCB transmission in the mobile communication system in accordance with the third embodiment of the present invention will be described with reference to the flow chart shown in FIG. 11.

First, the RCB transmitter is in a standby state at step 1101. The RCB transmitter determines, at step 1102, whether or not a point in time for transmitting the RCB has been reached. If a point in time for transmitting the RCB has not been reached, the RCB transmitter maintains the standby state at the above step 1101. However, if a point in time for transmitting the RCB has been reached, the RCB transmitter performs the following operation. The RCB generation part 1001 generates and outputs the RCB according to a data transmission rate determined under control of the scheduler (not shown) at step 1103. The spreading part 1002 spreads the generated RCB to output the spread RCB so that the RCB can be transmitted through the radio channel at step 1104. The transmission power control part 1003 performs a power control operation for the spread RCB with a power value that differs according to a data transmission rate of the packet data channel and outputs a result of the power control operation at step 1105. The RCB transmission part 1004 transmits the RCB to the RCB receiver at step 1106. Thus, the above-described data transmission rate control method can improve the reliability of transmitting the RCB.

Fourth Embodiment

Figure 12:
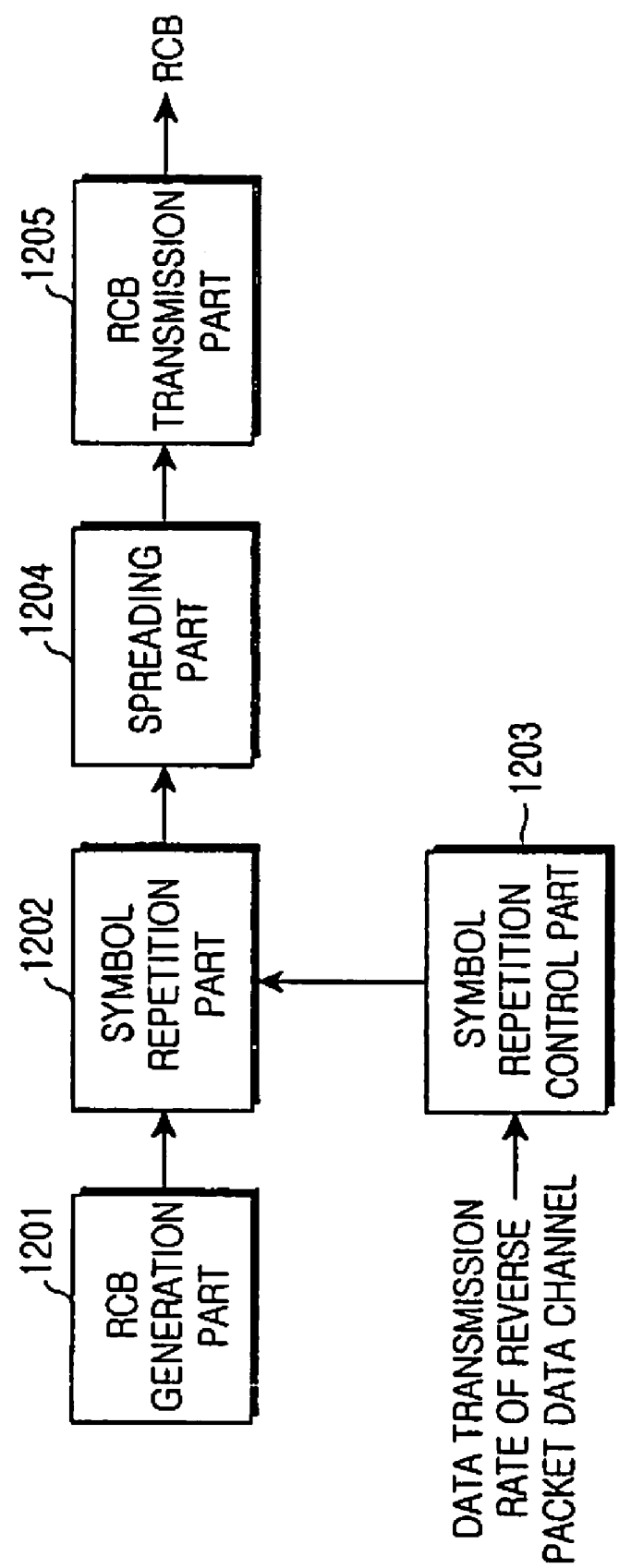
FIG. 12 is a block diagram illustrating the RCB transmitter in accordance with the fourth embodiment of the present invention.

The RCB transmitter in accordance with the fourth embodiment of the present invention as shown in FIG. 12 includes an RCB generation part 1201, a symbol repetition part 1202, a symbol repetition control part 1203, a spreading part 1204, and an RCB transmission part 1205.

When a scheduler (not shown) within the RCB transmitter (i.e. base station) determines whether the RCB must be incremented, decremented or continuously maintained, the RCB generation part 1201 generates and outputs the RCB according to a result of the determination. The symbol repetition part 1202 repeats the RCB according to a repetition control signal and then outputs the repeated RCB. The symbol repetition control part 1203 outputs the repetition control signal having a value that differs according to the data transmission rate of the packet data channel. Here, the symbol repetition control part 1203 decides the number of repeats according to the data transmission rate. Subsequently, the RCB repeated by the symbol repetition part 1202 is input into the spreading part 1204. In order for the RCB repeated by the symbol repetition part 1202 to be transmitted through the radio channel, the spreading part 1204 spreads the repeated RCB to output the spread RCB. The RCB transmission part 1205 transmits the RCB spread by the spreading part 1204 through the radio channel.

Figure 13:
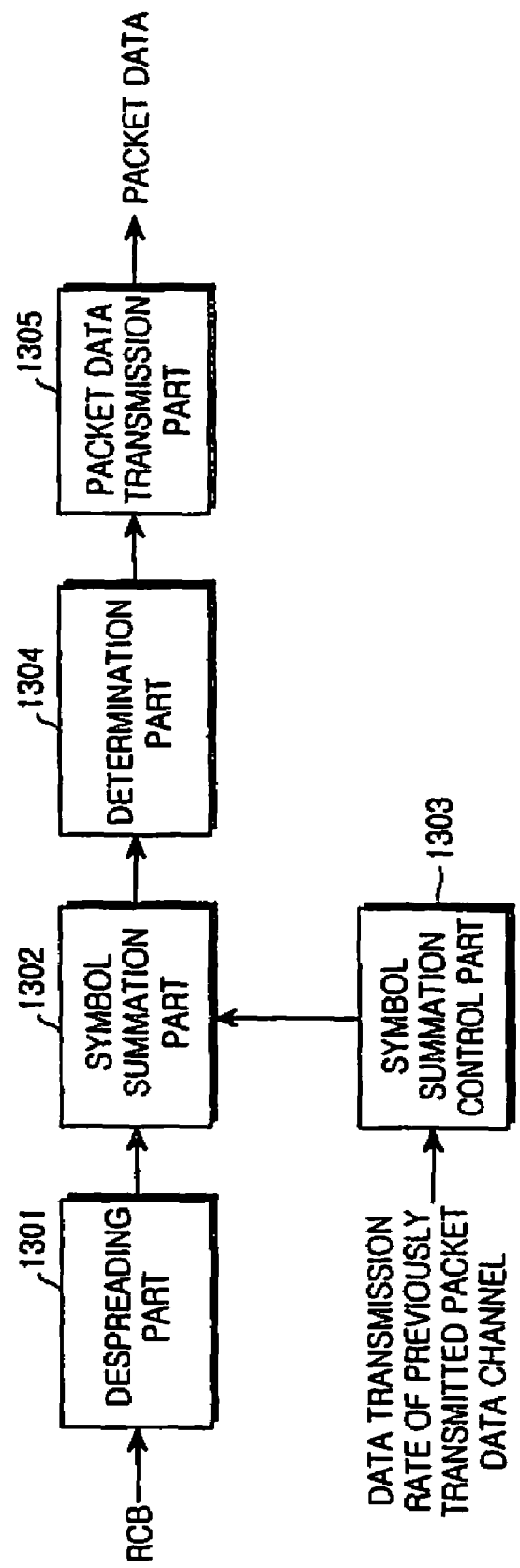
FIG. 13 is a block diagram illustrating an RCB receiver in accordance with the fourth embodiment of the present invention.

The RCB receiver in accordance with the fourth embodiment of the present invention as shown in FIG. 13 includes a despreading part 1301, a symbol summation part 1302, a symbol summation control part 1303, a determination part 1304 and a packet data transmission part 1305.

The despreading part 1301 receives the RCB through a transmission rate control channel, despreads the received RCB and outputs the despread RCB. The symbol summation part 1302 receives an output of the despreading part 1301, performs a summation operation for the output of the despreading part 1301 and outputs a result of the summation operation, according to a symbol summation control signal. At this point, the symbol summation control part 1303 outputs the symbol summation control signal so that the summation operation can be performed by the number of repeats predetermined according to a transmission rate of packet data previously transmitted through the packet data channel. The determination part 1304 receives an output of the symbol summation part 1302 and then determines whether the previously transmitted RCB is "0", "1" or "−1". Moreover, the determination part 1304 controls the data transmission rate according to a value of the previously transmitted RCB. The packet data transmission part 1305 transmits the packet data to the RCB transmitter according to a result of the determination by the determination part 1304.

Figure 14:
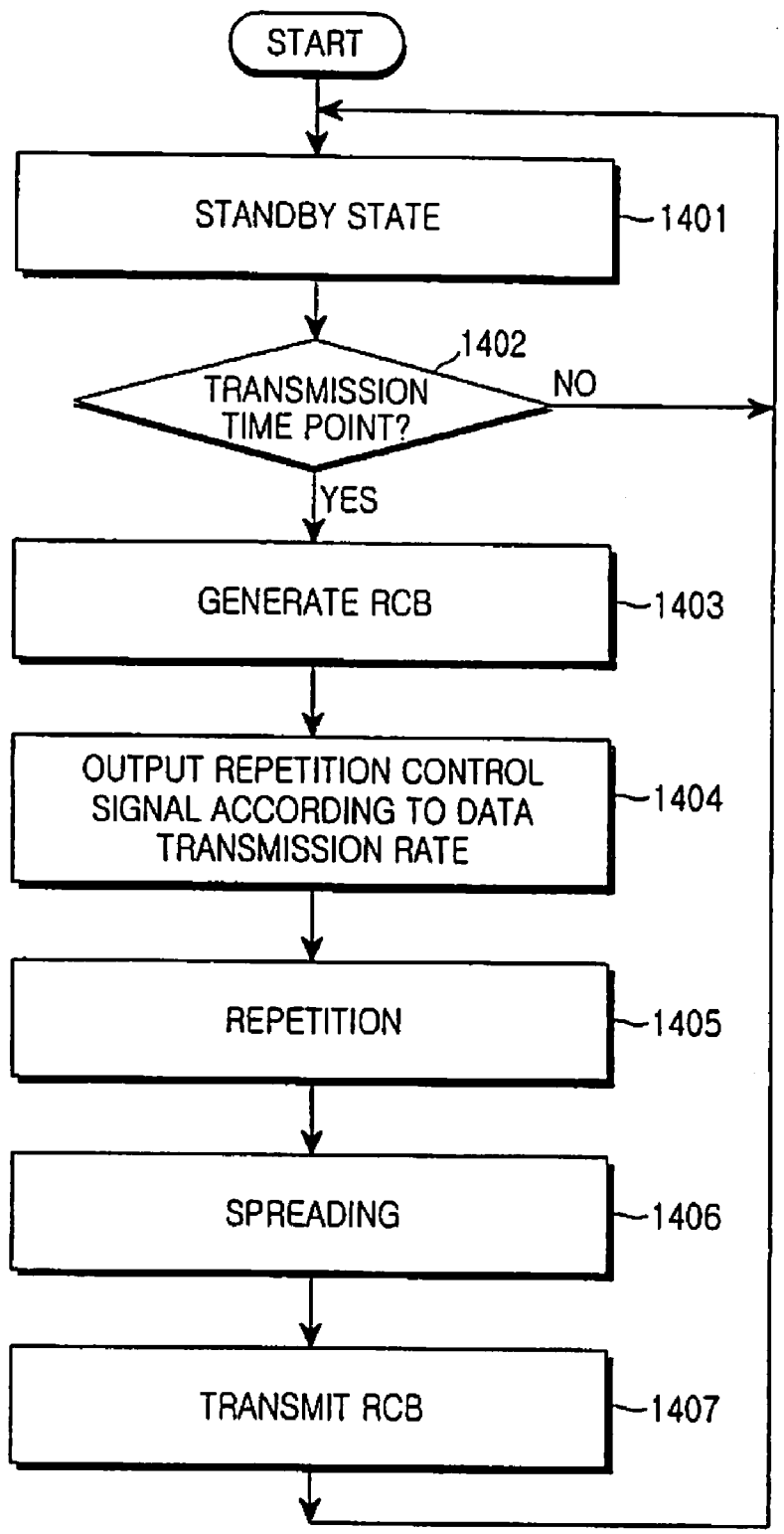
FIG. 14 is a flow chart illustrating a method for transmitting the RCB in accordance with the fourth embodiment of the present invention.

A method for transmitting the RCB in the mobile communication system in accordance with the fourth embodiment of the present will be described with reference to the flow chart shown in FIG. 14.

First, the RCB transmitter is in a standby state at step 1401. The RCB transmitter determines whether or not a point in time for transmitting the RCB has been reached at step 1402. If a point in time for transmitting the RCB has not been reached, the RCB transmitter maintains the standby state at the above step 1401. However, if a point in time for transmitting the RCB has been reached, the RCB transmitter performs the following operation. The RCB generation part 1201 generates an RCB based on the data transmission rate under control of the scheduler (not shown) and outputs the generated RCB at step 1403. The symbol repetition control part 1203 outputs the repetition control signal having a value differing according to a data transmission rate of the reverse packet data channel at step 1404. The symbol repetition part 1202 performs a symbol repetition operation according to the repetition control signal output from the symbol repetition control part 1203 and then outputs a result of the symbol repetition operation at step 1405. The spreading part 1204 spreads the RCB to output the spread RCB so that the RCB can be transmitted through the radio channel at step 1406. The RCB transmission part 1205 transmits the RCB spread by the spreading part 1204 to the RCB receiver at step 1407.

Thus, the above-described data transmission rate control method can improve the reliability of the RCB.

Figure 15:
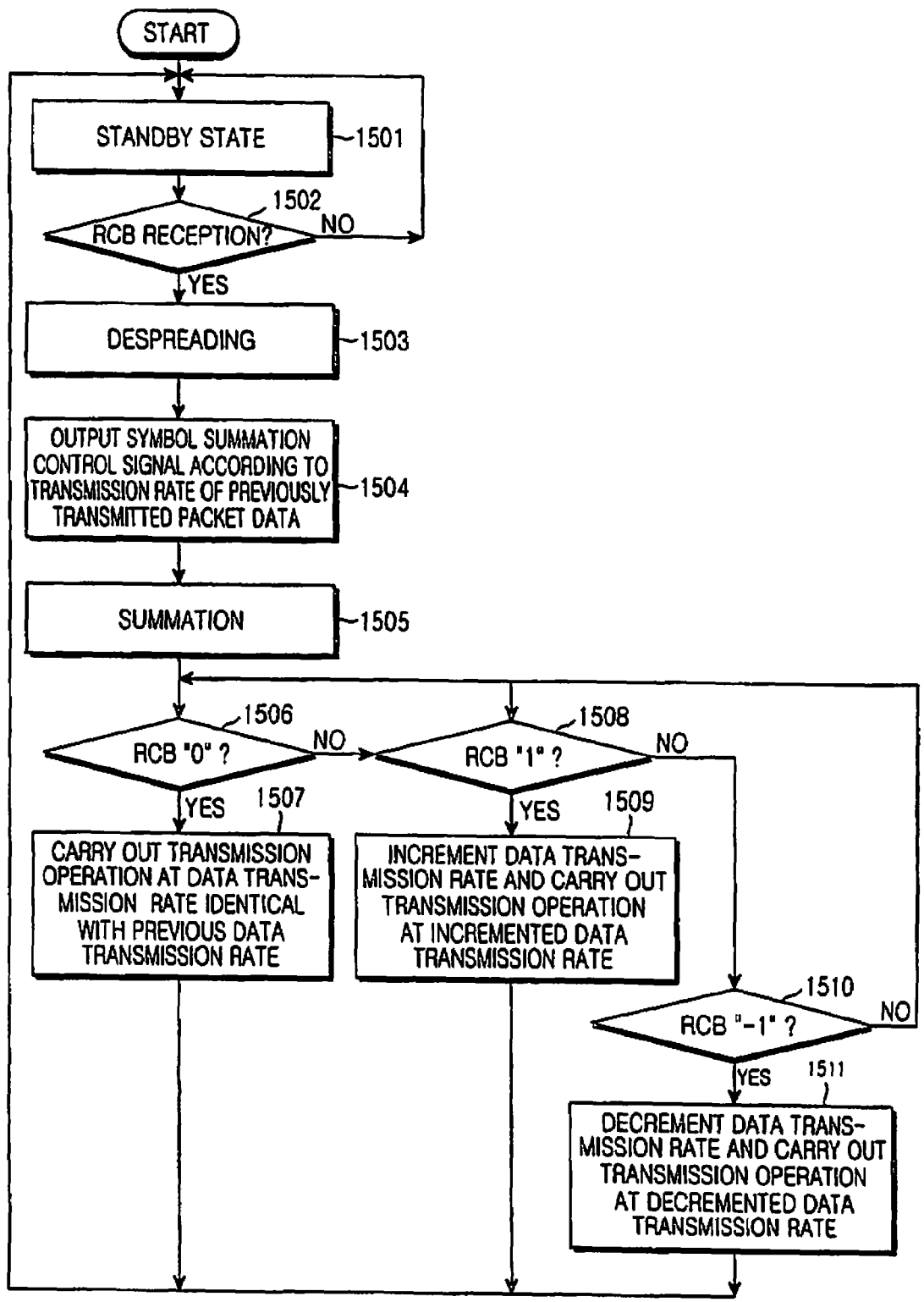
FIG. 15 is a flow chart illustrating a method for receiving the RCB in accordance with the fourth embodiment of the present invention.

A method for receiving the RCB in the mobile communication system in accordance with the fourth embodiment of the present invention will be described with reference to the flow chart shown in FIG. 15.

First, the RCB receiver is in the standby state at step 1501. The RCB receiver determines whether or not the RCB has been received from the RCB transmitter at step 1502. If no RCB has been received from the RCB transmitter, the RCB receiver continuously maintains the standby state at the above step 1501. However, if the RCB has been received from the RCB transmitter, the RCB receiver performs the following operation. The despreading part 1301 despreads the RCB received through the transmission rate control channel and outputs a result of the despreading at step 1503. Subsequently, the symbol summation control part 1303 outputs a symbol summation control signal so that a summation operation based on the predetermined number of repeats can be controlled according to a transmission rate of the packet data previously transmitted through the packet data channel at step 1504. The symbol summation part 1302 receives an output of the despreading part 1301, performs a symbol summation operation for the output of the despreading part according to the symbol summation control signal, and outputs a result of the symbol summation operation at step 1505. Subsequently, the determination part 1304 determines, at step 1506, whether or not the received RCB is "0". If the received RCB is "0", the packet data transmission part 1305 maintains a data transmission rate of the previous transmission interval in the next transmission interval at step 1507. However, if the previously transmitted RCB is not "0", the determination part 1304 determines, at step 1508, whether or not the previously transmitted RCB is "+1". If the previously transmitted RCB is "+1", the packet data transmission part 1305 increments a data transmission rate in the next transmission interval by one step at step 1509. However, if the previously transmitted RCB is not "+1", the determination part 1304 determines, at step 1510, whether or not the previously transmitted RCB is "−1". If the previously transmitted RCB is "−1", the packet data transmission part 1305 decrements the data transmission rate in the next transmission interval by one step at step 1511. Therefore, the RCB receiver transmits the packet data at the data transmission rate according to a result of the determination by the determination part 1304. If the RCB is neither "0", "+1", nor "−1" the process returns to step 1506.

The above-described data transmission rate control method can improve the reliability of receiving the RCB.

When transmitting the RCB, the base station can efficiently allocate resources by controlling the reliability of the RCB to be received by the mobile terminal according to a current data transmission rate in accordance with the present invention.

Moreover, the base station can more efficiently manage reverse system load or rise over thermal (RoT) by controlling the reliability of the RCB to be received by the mobile terminal according to the current data transmission rate.

Although the embodiments of the present invention have been disclosed for illustrative purposes, those skilled in the art will appreciate that various modifications, additions and substitutions are possible, without departing from the scope of the invention.

What is claimed is:

1. A method for controlling a reply signal transmission by a reply signal transmitter including an error detector, a repeater, a repeater controller, and a transmitter, in a mobile communication system, the method comprising:
   determining, by the error detector, whether an error is detected in received data through a radio channel;
   generating a reply signal according to the error detection;
   determining, by the repeater controller, a repetition control signal with a value that differs according to a data transmission rate;
   repeatedly replicating, by the repeater, the reply signal according to the repetition control signal; and
   transmitting, by the transmitter, the replicated reply signal through the radio channel.

2. The method of claim 1, wherein the reply signal includes an ACKnowledgement/Non-ACKnowledgement (ACK/NACK) signal.

3. A method for controlling a reply signal transmission by a reply signal transmitter including an error detector, a transmission power controller, and a transmitter, in a mobile communication system, the method comprising:
   determining, by the error detector, whether an error is detected in received data through a radio channel;
   generating a reply signal according to the error detection;
   controlling, by the transmission power controller, power for the reply signal with a power value that differs according to a data transmission rate; and
   transmitting, by the transmitter, the reply signal, based on the controlled power.

4. The method of claim 3, wherein the reply signal includes an ACKnowledgement/Non-ACKnowledgement (ACK/NACK) signal.

5. A method for controlling a reply signal reception by a reply signal receiver including a summer, a summer controller, and a determiner, in a mobile communication system, the method comprising:
   receiving, by the reply signal receiver, a reply signal through a radio channel;
   determining, by the summer controller, a symbol summation control signal for controlling summation based on a number of repetitions according to a transmission rate;
   summing, by the summer, the received reply signal according to the symbol summation control signal; and
   determining, by the determiner, whether a previously transmitted data has been accurately received, based on a result of the summing.

6. The method of claim 5, further comprising:
   retransmitting the previously transmitted data, if the previously transmitted data has not been accurately received.

7. The method of claim 5, further comprising:
   transmitting new data, if the previously transmitted data has been accurately received.

8. The method of claim 5, wherein the reply signal includes an ACKnowledgement/Non-ACKnowledgement (ACK/NACK) signal.

* * * * *